(12) United States Patent
Thorborg et al.

(10) Patent No.: US 11,951,390 B2
(45) Date of Patent: Apr. 9, 2024

(54) METHOD AND SYSTEM FOR INCREMENTAL TOPOLOGICAL UPDATE WITHIN A DATA FLOW GRAPH IN GAMING

(71) Applicant: Unity IPR ApS, Copenhagen (DK)

(72) Inventors: Janus Lynggaard Thorborg, Copenhagen (DK); Toulouse de Margerie, Montréal (CA); Wayne Johnson, Copenhagen (DK)

(73) Assignee: Unity IPR ApS, Copenhagen (DK)

( * ) Notice: Subject to any disclaimer, the term of this patent is extended or adjusted under 35 U.S.C. 154(b) by 472 days.

(21) Appl. No.: 17/341,359

(22) Filed: Jun. 7, 2021

(65) Prior Publication Data

US 2021/0379489 A1    Dec. 9, 2021

Related U.S. Application Data

(60) Provisional application No. 63/035,491, filed on Jun. 5, 2020.

(51) Int. Cl.
*A63F 13/352*    (2014.01)
*A63F 13/358*    (2014.01)

(52) U.S. Cl.
CPC .......... *A63F 13/352* (2014.09); *A63F 13/358* (2014.09)

(58) Field of Classification Search
CPC .............................. A63F 13/352; A63F 13/358
See application file for complete search history.

(56) References Cited

U.S. PATENT DOCUMENTS

| | | | |
|---|---|---|---|
| 8,730,245 B2* | 5/2014 | Lowe | G06T 13/40 345/475 |
| 9,550,125 B2* | 1/2017 | Baszucki | A63F 13/335 |
| 2006/0030405 A1* | 2/2006 | Robertson | A63F 13/52 463/30 |
| 2022/0008824 A1* | 1/2022 | Kothari | G06N 3/088 |

\* cited by examiner

*Primary Examiner* — William H McCulloch, Jr.
*Assistant Examiner* — Ankit B Doshi
(74) *Attorney, Agent, or Firm* — Schwegman Lundberg & Woessner, P.A.

(57) ABSTRACT

A method of rendering a virtual environment is disclosed. First application data is received. The first application data includes first graph data. The first graph data corresponds to a first state of an application. Second application data is received after the first application data. The second application data corresponds to a second state of the application. The first application data and the second application data are analyzed to determine a change in the first graph data associated with the second application data. An island subgraph within the first graph data that includes the change is determined. Second graph data is generated for the second state. The generating of the second graph data includes partially reconstructing the first graph data. The partial reconstructing includes rebuilding the determined island subgraph. The generated second graph data is communicated for rendering of the virtual environment in the second state.

20 Claims, 5 Drawing Sheets

METHOD AND SYSTEM FOR INCREMENTAL TOPOLOGICAL UPDATE WITHIN A DATA FLOW GRAPH IN GAMING

CROSS-REFERENCE TO RELATED APPLICATIONS

This application claims the benefit of U.S. Provisional Application No. 63/035,491, filed Jun. 5, 2020, entitled "METHOD AND SYSTEM FOR INCREMENTAL TOPOLOGICAL UPDATE WITHIN A DATA FLOW GRAPH IN GAMING," which is incorporated by reference herein in its entirety.

TECHNICAL FIELD

The subject matter disclosed herein generally relates to the technical field of digital content creation with computer systems, and in one specific example, to computer systems and methods for creating and manipulating data graphs for processes related to aspects of computer-implemented games.

BACKGROUND OF THE INVENTION

Creating digital content, such as used in modern computer video games, can be a very complicated process involving code writing, set and character creation, animation, and so forth. Some digital content creation artists and technicians use tools to create data graphs for processes related to different aspects of video games such as character animation, game play and rendering. The tools can include timeline editors, visual scripting tools, state machines and nodal editors. Stitching nodes of a graph together allows a creator to build bigger behaviors and computational machines, which can allow technical artists to structure scripting, execution and behavior of a game. Typical examples of nodes include audio, video, and animation clip players, mixers, logical selectors, layering algorithms and more. However, calculating topology for a data graph is computationally heavy since you have to consider every node (vertex) and connection (edge).

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D scene environments, 2D simulation environments, 2D content creation environments, and the like), 3D digital environments (e.g., 3D game environments, 3D simulation environments, 3D scene environments, 3D content creation environment, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset' and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime.

The terms 'client' and 'application client' used throughout the description herein are understood to include a software client or software application that can access data and services on a server, including accessing over a network.

Throughout the description herein, the term 'mixed reality' (MR) should be understood to include all combined environments in the spectrum between reality and virtual reality (VR) including virtual reality, augmented reality (AR) and augmented virtuality.

A method of rendering a virtual environment is disclosed. First application data is received. The first application data includes first graph data. The first graph data corresponds to a first state of an application. Second application data is received after the first application data. The second application data corresponds to a second state of the application. The first application data and the second application data are analyzed to determine a change in the first graph data associated with the second application data. An island subgraph within the first graph data that includes the change is determined. The island subgraph relates to an aspect of a virtual environment, wherein the aspect is present within the first and the second state. Second graph data is generated for the second state. The generating of the second graph data includes partially reconstructing the first graph data. The partial reconstructing includes rebuilding the determined island subgraph. The generated second graph data is communicated for rendering of the virtual environment in the second state.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

Figure 2:
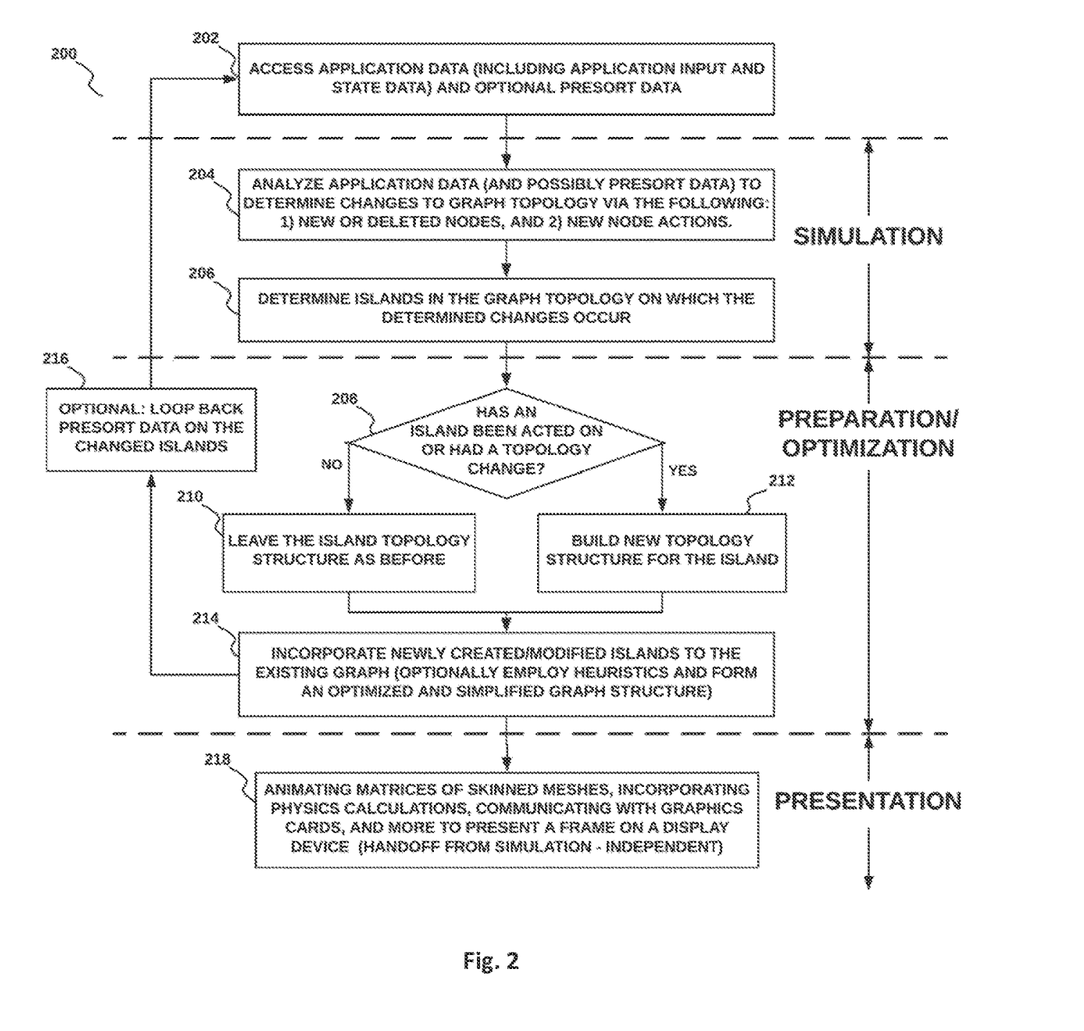
FIG. 2 is a schematic illustrating a method for incremental topological updating using an incremental topological system, in accordance with one embodiment.

The systems and methods described herein include one or more components or operations that are non-routine or unconventional individually or when combined with one or more additional components or operations, because, for example, they provide a number of valuable benefits to digital content creators. For example, the systems and methods described herein improve an efficiency of executing runtime topological changes to a data graph structure by analyzing the changes (e.g., as described in operation 206 below) and creating a minimal set of acceleration structures for efficient execution of the new topological structure based only on the topology that has changed (e.g., as described in operation 212 and operation 214 below). The runtime topological changes occuring during a time in which a program is running or executing (e.g., an application, a video game, a simulation, and the like).

The disclosure herein describes systems and methods, including non-routine or unconventional components or operations, or combinations of such components or operations, for making real-time incremental topological changes to a data graph and optimizing the data graph for execution efficiency of displaying real-time graphics and animation (e.g., within a video game, simulation, augmented reality application, or the like). A graph in this context includes atomized polymorphic behaviors represented by nodes connected in a graph structure. The structure may be created by node authors and end users in compositional tools (e.g., including timelines, visual scripting editors, state machines and nodal editors), wherein the graph structure includes directed acyclic graphs (DAGs). Stitching nodes together with compositional tools allows creators to build complex behaviors and computational machines, which provides a mechanism for technical artists to structure scripting, execution and behavior (e.g., within game development). In accordance with an embodiment, examples of nodes include audio clip players, video clip players, animation clip players, mixers, logical selectors, layering algorithms, scripts, and post FX (e.g., post processing visual effects). The atomized structure of nodes in the graph allows nodes of the graph to have interchangeable behaviors using downloadable content (DLC) rather than using code changes to modify behaviors (e.g., avoiding or minimizing updates to an application which can be expensive and slow). In accordance with an embodiment, the graph may represent a flow of data, describing products and consumables for each node. In addition, a single graph may contain nodes for animation, audio, scripts, and more. The systems and methods described herein for computing data graph topology in an efficient way over time can improve displaying of graphics and animation (e.g., within games) in real-time.

Figure 1A:
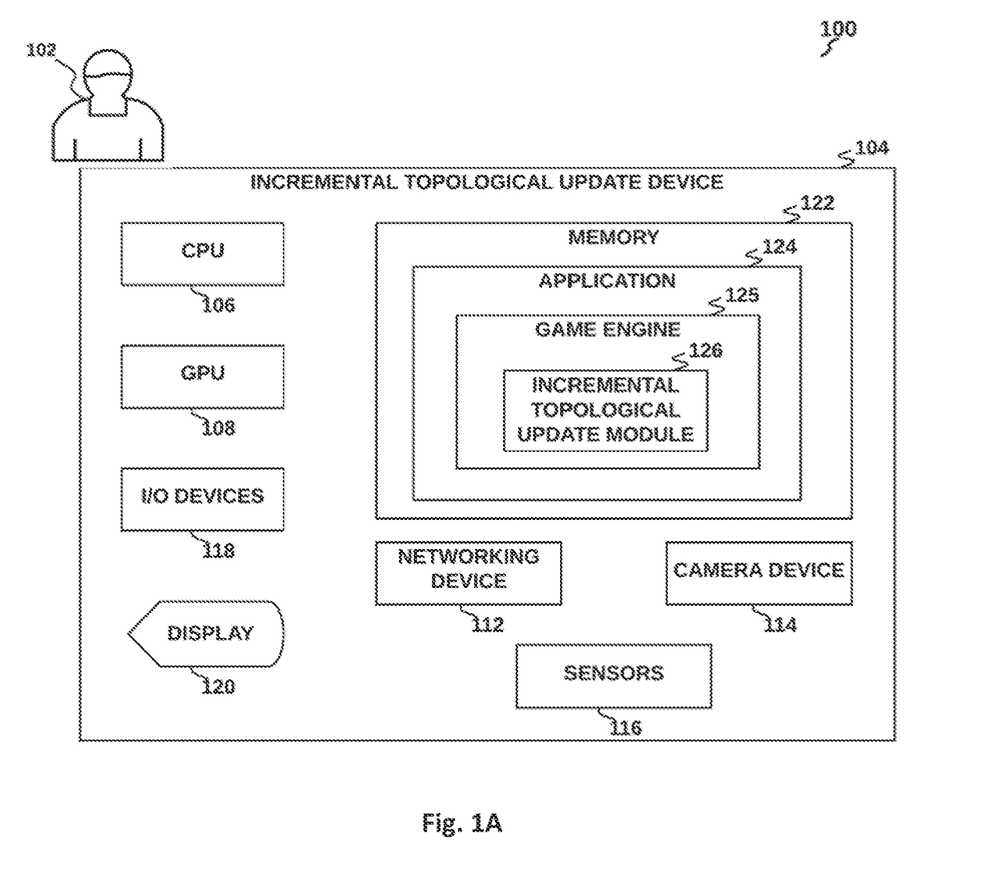
FIG. 1A is a schematic illustrating an incremental topological device, in accordance with one embodiment.

Turning now to the drawings, systems and methods, including non-routine or unconventional components or operations, or combinations of such components or operations, for making real-time incremental topological changes to a data graph for displaying graphics and animations in accordance with embodiments of the invention are illustrated. In accordance with an embodiment, FIG. 1A is an illustration of an example incremental topological update system 100 including an incremental topological update device 104 and associated devices configured to provide incremental topological update functionality. In accordance with an embodiment, the incremental topological update device 104 is a computing device capable of providing a digital environment to a user 102. In some embodiments, the incremental topological update device 104 is a mobile computing device, such as a smartphone, a tablet computer, or a head mounted display (HMD) device, while in other embodiments, the incremental topological update device 104 is a computing device such as a desktop computer or workstation.

In accordance with an embodiment, the incremental topological update device 104 includes one or more central processing units (CPUs) 106 and graphics processing units (GPUs) 108. The processing device 104 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks as described herein in reference to FIG. 2. The incremental topological update device 104 may also include one or more networking devices 112 (e.g., wired or wireless network adapters) for communicating across a network. The incremental topological update device 104 may also include one or more camera devices 114 which may be configured to capture digital video of the real world near the device 104. The incremental topological update device 104 may also include one or more sensors 116, such as a global positioning system (GPS) receiver (e.g., for determining a GPS location of the incremental topological update device 104), biometric sensors (e.g., for capturing biometric data of the user 102), motion or position sensors (e.g., for capturing position data of the user 102, the device 104, or other objects), or an audio microphone (e.g., for capturing sound data). Some sensors 116 may be external to the incremental topological update device 104, and may be configured to wirelessly communicate with the incremental topological update device 104 (e.g., such as used in the Microsoft Kinect®, Vive Tracker™, MIT's Lidar sensor, or MIT's wireless emotion detector).

The incremental topological update device 104 also includes one or more input devices 118 such as, for example, a mouse, a keyboard, a keypad, a touch screen, a microphone, a pointing device, a camera, a hand-held device (e.g., hand motion tracking device), and the like, for inputting information in the form of a data signal readable by the processing device 106. The incremental topological update device 104 further includes one or more display devices 120, such as a touchscreen of a tablet or smartphone, or lenses or visor of a VR or AR HMD, which may be configured to display virtual objects. The display device 120 may be driven or controlled by one or more GPUs 108. The GPU 108 processes aspects of graphical output that assists in speeding up rendering of output through the display device 120.

The incremental topological update device 104 also includes a memory 122 configured to store an incremental topological update module 126. The memory 122 can be any type of memory device, such as random access memory, read only or rewritable memory, internal processor caches, and the like. The memory also stores an application 124 (e.g., executed by the CPU 106 or GPU 108) that communicates with the display device 120 and also with other hardware such as the input/output device(s) 116 to present a digital environment (e.g., a 3D video game, a 3D content creation environment, a 3D simulation, and the like) on the display device 120. In accordance with an embodiment, the application may be a video game application. In accordance with an embodiment, the application may include a game engine 125, whereby the game engine would typically include one or more modules that provide the following: simulation of a virtual environment and game objects therein (e.g., including animation of game objects, animation physics for game objects, collision detection for game objects, and the like), rendering of the virtual environment and the game objects therein, networking, sound, and the like in order to provide the user with a complete or partial virtual environment (e.g., including video game environment or simulation environment) via the display device 120. In accordance with an embodiment, the simulation and rendering of the virtual environment may be de-coupled, each being performed independently and concurrently, such that the rendering step always uses a recent state of the virtual environment and current settings of the virtual scene to generate a visual representation at an interactive frame rate and, independently thereof, the simulation step updates the state of at least some of the digital objects (e.g., at another rate). In accordance with an embodiment, the game engine 125 may render parts of a digital environment into an image or series of images (e.g., as part of a video game). In accordance with an embodiment, the application 124 may include an incremental topological update module 126 that performs operations as described below with respect to FIG. 2. Although the incremental topological update module 126 is shown as a part of the game engine 125 and application 124, the incremental topological update module 126 may be implemented separately from the application 124 or separately from the game engine 125 (e.g., as a plugin or as a completely separate application).

Figure 1B:
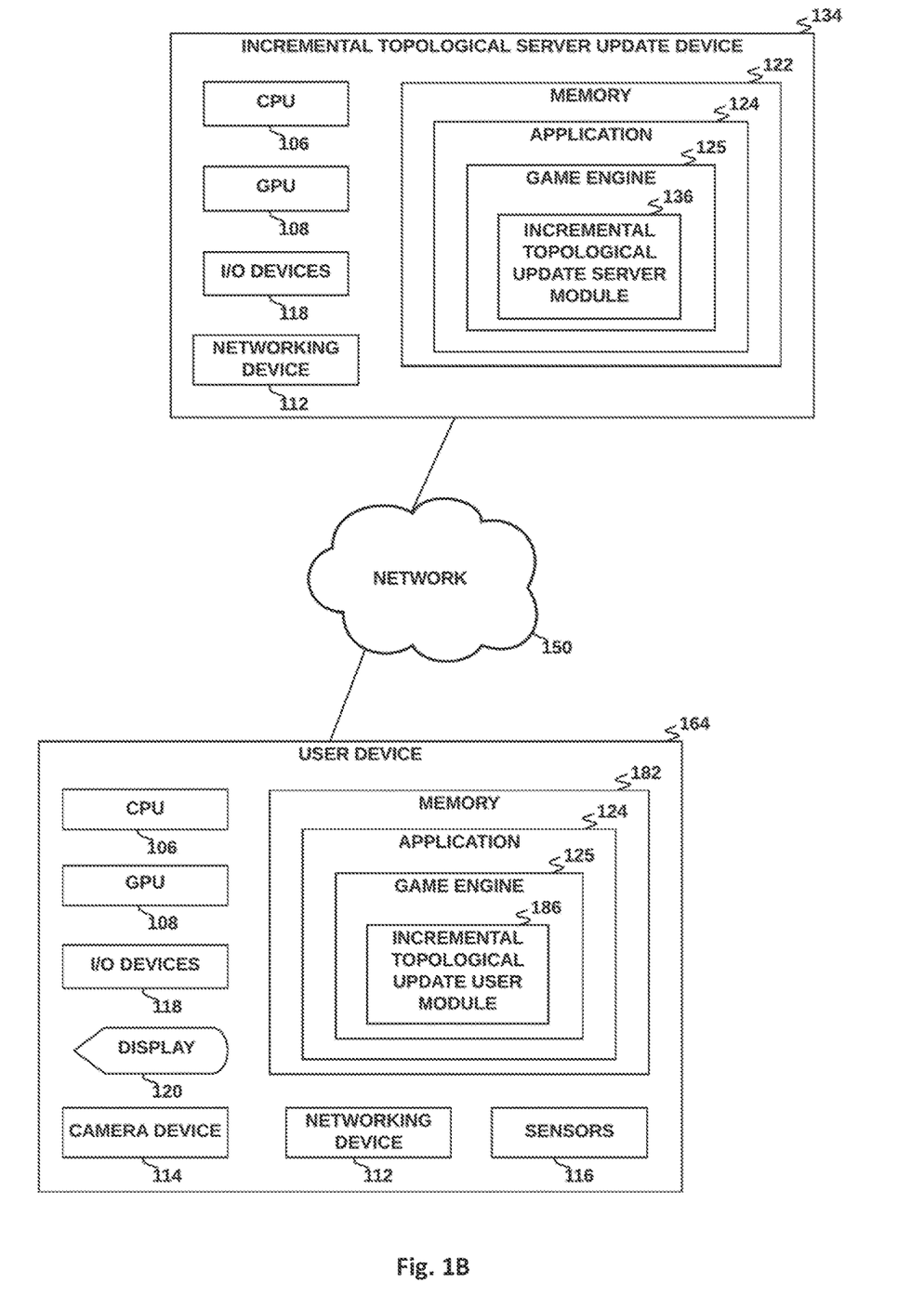
FIG. 1B is a schematic illustrating an incremental topological server device in a network configuration, in accordance with one embodiment.

In accordance with an embodiment and shown in FIG. 1B, the incremental topological update system may be implemented over a network 150 (e.g., a cellular network, a Wi-Fi network, the Internet, and so forth) in a server-client mode. As shown in FIG. 1B, an incremental topological server update device 134 may be coupled in networked communication with a user device 164 via the network 150. The incremental topological server update device 134 may be similar to the incremental topological update device 104 described in FIG. 1A wherein the game engine 125 includes an incremental topological update server module 136 similar to the incremental topological update module 126. The user device 164 may be similar to the incremental topological update device 104 described in FIG. 1A wherein a memory 182 includes the game engine 125 which includes an incremental topological update user module 186 similar to the incremental topological update module 126. In accordance with an embodiment, some aspects of an incremental topological graph update method 200 described below are performed on the server device 134 by the server module 136, while others are performed on the user device 164 by the user module 186. For example, in a multiplayer configuration, operations 202, 204, 206, 208, 210, 212, 214 and 216 may be performed by the server module 136 and operation 218 may be performed by the user module 186.

In some embodiments, the incremental topological update system 100 and the various associated hardware and software components described herein may provide augmented reality (AR) content instead of, or in addition to, virtual reality (VR) content (e.g., in a mixed reality (MR) environment). It should be understood that the systems and methods described herein may be performed with AR content and VR content, and as such, the scope of this disclosure covers both AR and VR applications.

In accordance with an embodiment, FIG. 2 is a flowchart of an incremental topological graph update method 200 for optimizing a simulation and presentation of graphics and animation (e.g., video game) data. The method 200 may be performed by the incremental topological update module 126 (e.g., within a game engine 125 or application 124) in conjunction with the incremental topological update system 100 as described with respect to FIG. 1. In various embodiments, some of the method elements shown may be performed concurrently, in a different order than shown, or may be omitted. In accordance with an embodiment, the method 200 may be performed as the application 124 updates (e.g., via the game engine 125) a presentation of a video game during a runtime of the video game (e.g., as the video game is being played by a user). The method 200 may be used to optimize a change (e.g., including an addition, deletion or modification) to an existing data graph, and accordingly, the method 200 may be performed in conjunction with a second method for creating a full data graph structure for execution (e.g., creating a graph from scratch).

In accordance with an embodiment, the method 200 includes a simulation phase which includes operations that may be included in a simulation of an application state (e.g., a game state, a simulation state, or the like), and a phase including a presentation of the simulated application state. In accordance with an embodiment, the method 200 may include an operation (e.g., an operation within operation 204) which simulates an application state and generates a complete data graph, wherein the complete data graph represents the simulated application state. In accordance with an embodiment, the method 200 may receive a complete data graph (e.g., within operation 204), wherein the complete data graph represents the simulated application state from an external system or process. Throughout the description herein, the term 'graph' may be used to represent a 'data graph'. The presentation phase may include a displaying of a video frame (e.g., associated with the application state) on a display device 120. In accordance with an embodiment, the presentation phase may include operation 218 described below. While the presentation phase may use output from the simulation phase, the two phases can run independently of each other with respect to execution time related to a video frame rate. Accordingly, the simulation may occur at one rate of time (e.g., 30 simulations per second, or 60 simulations per second) while the presentation occurs at the same or a different rate of time (e.g., more often or less often). For example, the application 124 may use the module 126 and the method 200 to simulate artificial intelligence (AI) logic every 5th frame, but still render (e.g., with interpolation) a presentation of the simulation every frame. Similarly, based on the method being used in a server-client mode (e.g., as described in FIG. 1B), a server device 134 running the application 124 (e.g., a game) may use the incremental topological update server module 136 to simulate a state of the application (e.g., a video game state) at a fixed 60 frames per second, while a local device (e.g., low quality user device 164) may present the simulation at 30 frames per second using the application 124 and game engine 125.

In accordance with an embodiment, the method 200 includes operations for preparation and optimization of the data graph as part of the simulation phase (e.g., or between the simulation phase and the presentation phase). In accordance with an embodiment, the operations may prepare and optimize a data graph for presentation in the presentation phase. In accordance with an embodiment, the preparation of the data graph may include generating a data graph (e.g., using application data) and modifying the data graph. In accordance with another embodiment, the preparation of the data graph may include receiving a data graph (e.g., receiving a data graph generated by an external system or operation), and modifying the received data graph. Output from the simulation phase includes a graph to be executed during the presentation phase. Operations during the simulation phase may generate (e.g., determine and create) a topology for the graph based on application input data (e.g., game state data). Operations during the presentation phase may execute the graph generated during the simulation phase (described below with respect to operation 218). In accordance with an embodiment, and shown in FIG. 2, the preparation and optimization phase may include operations 208, 210, 212, 214, and 216.

In accordance with an embodiment, based on the application 124 being a video game, input received by the application 124 during game play may change a game state causing the simulation phase to change part or all of a data graph representing the state. For example, based on a game player pressing a space bar on a computer keyboard, the simulation phase may add a jumping state graph to an overall game state graph, wherein the jump state graph linked to the space bar input may be added to a portion of the overall game state graph which is related to a character.

In accordance with an embodiment, and shown in FIG. 2, at operation 202 of the method 200, the incremental topological update module 126 accesses (e.g., receives) application data from the application 124 (e.g., game data from a video game) and optionally accesses presort data (presort data is described below with respect to operation 216). In accordance with an embodiment, the accessed application data may relate to at least one frame which is to be created (e.g., and displayed) for the application 124. The application data may include application state data and application input data. The application state data including any data which describes a current state of the application (e.g., location and state of characters and other objects, state of the environment, and more). The application inputs including any input to the application 124 provided by an external agent (e.g., a player of a game) via input devices 118 (including but not limited to joystick input, keyboard input, touch screen input, and the like). The application input may be accessed from a server device (e.g., across a network). For example, based on the application being a game, the application input may be provided by a player of the game to control an element of the game which is controllable; including objects such as characters, weapons, vehicles, and more. In accordance with an embodiment, the application state data may include a data graph describing a state (e.g., a current state) of the application (e.g., created by an additional system or module). In accordance with an embodiment, the incremental topological update module 126 may use the application data and the application input to generate a data graph describing a state of the application.

In accordance with an embodiment, at operation 204 of the method 200, the incremental topological update module 126 analyzes the application data (and optionally the presort data from operation 216) to determine changes to a data graph topology, wherein the data graph topology is associated with a state of the application (e.g., a current state), and the changes to the data graph topology are based on changes to a state of the application 124. The data graph may be the data graph received or generated in operation 202. In accordance with an embodiment, the changes to the state and the graph may be caused by the application input (e.g., joystick input) and may be caused by an execution of the application 124 (e.g., caused by an execution of code within the application 124). The analysis to determine the change may include a determination of any of the following node changes, based on the application data: a deletion of one or more existing nodes in the graph, an addition of one or more new nodes to the graph, a modification of actions performed by a node which impact the graph (e.g., including creating new node connections and creating new nodes). In accordance with an embodiment, the analysis may include comparing the application data to application data from a previous frame (or previous state) to determine differences in an application state. The determined differences in the application state may be used to determine the node changes. Similarly, application input data can be analyzed to determine the node changes. For example, an input (e.g., joystick signal) used to control an object in a game (e.g., a character or weapon) may directly change nodes associated with the object (e.g., which may be represented in the graph within an island). An input (e.g., button press on a joystick) may be a control for initiating a jump action for a character, causing an animation state machine to add a jump animation to a graph associated with the character.

In accordance with an embodiment, at operation 206 of the method 200, based on a detection of a change to the graph topology (e.g., as determined in operation 204), the incremental topological update module 126 determines one or more graph islands in the graph topology on which the determined changes occur. The incremental topological update module 126 may label or mark the determined one or more graph islands in the graph topology on which the determined changes occur. Throughout the description herein, graph islands may be referred to as 'islands'. In accordance with an embodiment, an island includes a connected component (e.g., a subgraph) within a larger graph (e.g., a supergraph). For example, an island may represent (e.g., as an island data structure) a single character in a multiplayer game. In accordance with an embodiment, an island may include a plurality of related groups of islands. For example, a related group may include a plurality of islands that each represent a single state of an island graph (e.g., one graph in the group may represent a character running while another graph in the group may represent the character jumping).

In accordance with an embodiment, at operation 210 of the method 200, based on there being no determined change to a topology of an island, the topology of the island is left unchanged (e.g., the island topology remains as it was from a previous frame).

In accordance with an embodiment, at operation 212 of the method 200, based on there being a determined change to a topology of an island (e.g., determined during operation 206), the incremental topological update module 126 builds a new topology structure for the island based on the changes determined in operation 204. The building may include adding one or more new nodes, removing one or more nodes, changing the connections between nodes, wherein the adding, removing, and changing are done based on the changes determined in operation 204. In accordance with an embodiment, in order to improve efficiency, operation 212 may be performed as a batch operation wherein more than one islands that have incurred a change (as determined in operation 206) are built in one batch operation. In accordance with an embodiment, the batch operations may be done with parallel computing (e.g., with computations for each island build occurring in parallel, including having computations for each island build occurring on a separate processor).

In accordance with an embodiment, at operation 214 of the method 200, the incremental topological update module 126 incorporates the changed islands (e.g., the newly built islands from operation 212) into an existing data graph to create a new data graph (e.g., wherein the existing data graph may be the data graph received or generated in operation 202). The incorporation including a merging process where new islands created in operation 212 (e.g., newly structured islands) are merged with the existing data graph (e.g., wherein the new islands may replace associated existing islands). For example, an existing island that included a change as determined during operation 206 may be deleted from the existing data graph and replaced with the new island created for the existing island during operation 212. In accordance with an embodiment, during operation 214, islands wherein no change has been detected within operation 206 are not modified by the incremental topological update module 126.

In accordance with an embodiment, as part of operation 214 of the method 200, the incremental topological update module 126 may optionally employ heuristics on the new data graph to create an optimized and simplified structure of the new data graph for execution in operation 218. The heuristics may prepare the new data graph and prepare data needed by operations executing the graph (e.g., needed by operations within operation 218). In accordance with an embodiment, the heuristics may be employed based on the new data graph having a fixed topology (e.g., after operation 214) and therefore the data needed by operations executing the new data graph may be changed for execution efficiency, wherein the changes employed by the heuristics may include rearrange nodes, connections, and data and so that an execution of operations that require the data are optimized.

In accordance with an embodiment, the heuristics may be performed only on parts (e.g., islands) of the new data graph which have been rebuilt in operation 212. In accordance with an embodiment, as part of the heuristics, the incremental topological update module 126 may patch the changed islands of the new data graph (e.g., patch each island built during operation 212) such that nodes within the changed island can read output from associated parent nodes. The patching may include rewriting memory pointers to directly refer to results in the "upstream" graph (e.g., which may allow an execution of the new data graph without pulling and recursion).

In accordance with an embodiment, as part of the heuristics of operation 214, the incremental topological update module 126 may perform memory compaction by rearranging memory locations for data associated with changed islands such that the data is compactly written in memory (e.g., contiguous) and written in an order which is consistent with an order in which data is needed during execution (e.g., execution as described below with respect to operation 218).

In accordance with an embodiment, as part of the heuristics of operation 214, the incremental topological update module 126 may apply targeted removal of one or more islands based on the one or more islands producing only a marginal rendering output based on a threshold. For example, based on the one or more islands only contributing a minor visual change in a rendered frame (based on a threshold), the module 126 might remove the one or more islands. In accordance with an embodiment, as part of the heuristics of operation 214, the incremental topological update module 126 may ignore one or more islands based on the one or more islands producing only a marginal rendering output based on a threshold. The ignoring may be accomplished using a rendering flag during a rendering.

In accordance with an embodiment, at operation 216 of the method 200, the incremental topological update module 126 optionally generates 'presort' data which includes a description of islands that are changed as determined in operation 206 (e.g., a list of islands that have changed and a description of associated changes). The presort data may be used as described with respect to operation 204 to help determine and track islands that change over time.

In accordance with an embodiment, at operation 218 of the method 200, a final new data graph created during operation 214 is received and used to create an image for the frame. In accordance with an embodiment, the final new data graph includes the optimizations (e.g., including the simplifications and applied heuristics) performed during operation 214. In accordance with an embodiment, operation 218 may also include an operation for displaying the image on a display device 120. In accordance with an embodiment, operation 218 may be performed independently of the preceding operations (e.g., independently of operation 202 through to operation 214) based on receiving the final new data graph. In accordance with an embodiment, a topology and memory layout of the final new data graph is fixed (e.g., does not change) throughout operation 218. In accordance with an embodiment, operation 218 may include a plurality of sub-operations for rendering an image from the final new data graph structure, including: animating matrices of skinned meshes, incorporating physics calculations, communicating with graphics cards, and more.

In accordance with an embodiment, using the method 200 within an application (e.g., within a video game) may result in a flat cost when rebuilding an island regardless of however many changes that were made to the island due to all changes being implemented during operation 212. The flat cost occurs once (e.g., one time during a rebuilding of the island topology in operation 212), which may result in a benefit with respect to a reduction in total execution time of the simulation phase (e.g., including combined execution time from operation 202, 204, 206, 210, 212, and 214) when compared to a simulation without the method 200. In accordance with an embodiment, the flat cost may also include a benefit of determinism of time used per frame for execution of the simulation phase when compared to a simulation without the method 200 (e.g., a computational cost of simulation may be more predictable). The determinism may reduce variations in computation time of a simulation phase and a presentation phase which is typically referred to as "micro stuttering" during a video game.

In accordance with an embodiment, based on the application 124 being a video game, the method 200 may provide computational efficiency based on performing computation only for elements within the game that change (e.g., wherein the elements are associated with islands and only islands associated with changed elements are processed in operation 212 for a frame). For example, in a typical multiplayer video game there may be 250 characters controlled by 250 players; however, rarely are all 250 characters performing an action at the exact same time (e.g., jumping in the same frame). Accordingly, based on a single character jumping, using the method 200 to only change topology within operation 212 associated with the lumping character (e.g., an island associated with the jumping character may be changed in operation 212), the method 200 amortizes a computational cost associated with "frequent, but not every frame" topological modifications in order to spread the computational cost of displaying character changes to be, for example, on average $\frac{1}{250}$th every frame, based on only one character of the 250 characters jumping at any one frame (e.g., two jumping characters may generate 2 times the amortized computational cost, three jumping characters may generate 3 times the amortized computational cost, and so on). As a counter example, based on a graphics system not using the method 200, the graphics system may recreate a complete topology that includes all 250 subgraphs for characters at each frame (e.g., even characters that have no changes), and accordingly, the 250 subgraphs associated with the 250 characters would be recomputed for each frame, resulting in a higher computational burden.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance or the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors processor-implemented modules may be distributed across a number of geographic locations.

Figure 3:
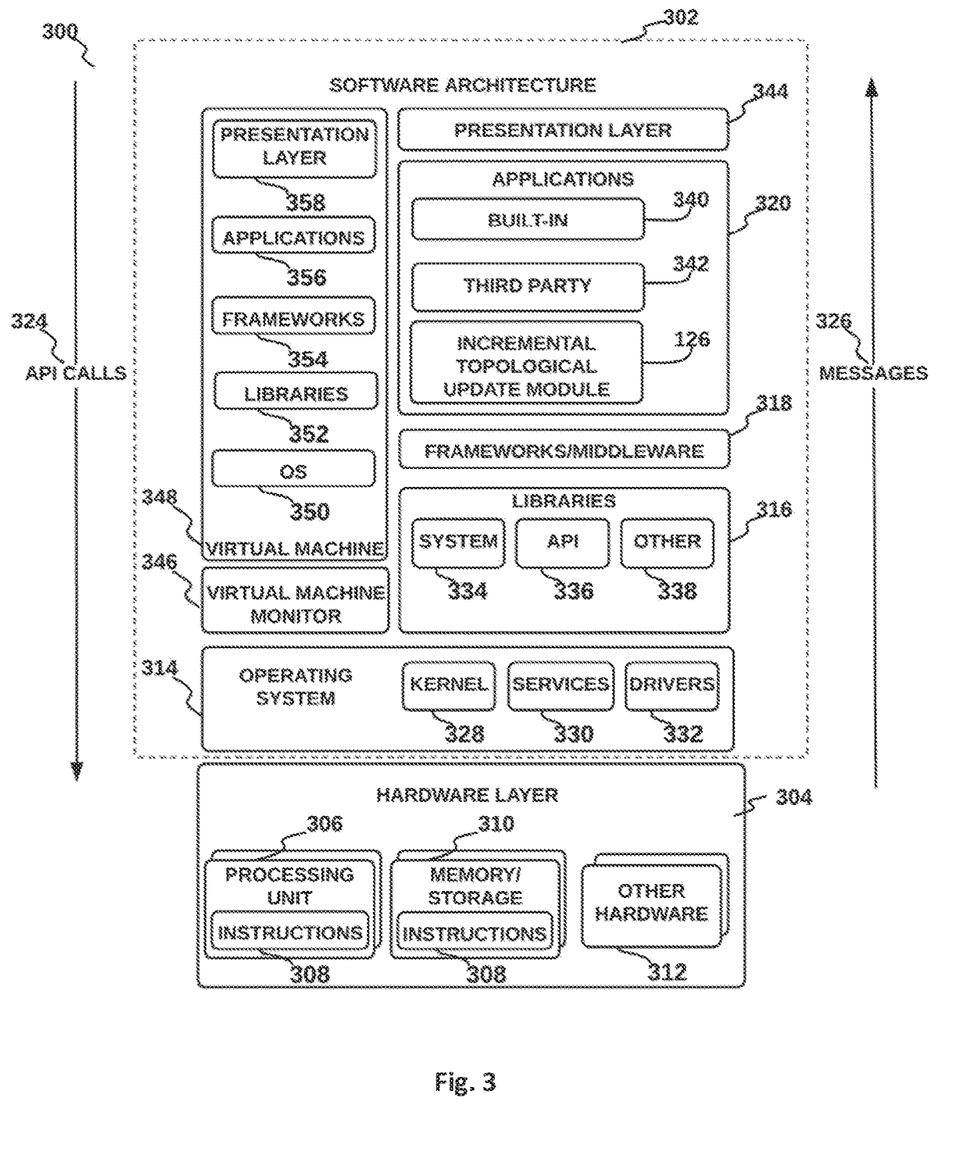
FIG. 3 is a block diagram illustrating an example software architecture, which may be used in conjunction with various hardware architectures described herein.

FIG. 3 is a block diagram 300 illustrating an example software architecture 302, which may be used in conjunction with various hardware architectures herein described to provide a gaming engine 301 and/or components of the incremental topological update system 100. FIG. 3 is a non-limiting example of a software architecture and it will be appreciated that many other architectures may be implemented to facilitate the functionality described herein. The software architecture 302 may execute on hardware such as a machine 400 of FIG. 4 that includes, among other things, processors 410, memory 430, and input/output (I/O) components 450. A representative hardware layer 304 is illustrated and can represent, for example, the machine 400 of FIG. 4. The representative hardware layer 304 includes a processing unit 306 having associated executable instructions 308. The executable instructions 308 represent the executable instructions of the software architecture 302, including implementation of the methods, modules and so forth described herein. The hardware layer 304 also includes memory/storage 310, which also includes the executable instructions 308. The hardware layer 304 may also comprise other hardware 312.

In the example architecture of FIG. 3, the software architecture 302 may be conceptualized as a stack of layers where each layer provides particular functionality. For example, the software architecture 302 may include layers such as an operating system 314, libraries 316, frameworks or middleware 318, applications 320 and a presentation layer 344. Operationally, the applications 320 and/or other components within the layers may invoke application programming interface (API) calls 324 through the software stack and receive a response as messages 326. The layers illustrated are representative in nature and not all software architectures have all layers. For example, some mobile or special purpose operating systems may not provide the frameworks/middleware 318, while others may provide such a layer. Other software architectures may include additional or different layers.

The operating system 314 may manage hardware resources and provide common services. The operating system 314 may include, for example, a kernel 328, services 330, and drivers 332. The kernel 328 may act as an abstraction layer between the hardware and the other software layers. For example, the kernel 328 may be responsible for memory management, processor management (e.g., scheduling), component management, networking, security settings, and so on. The services 330 may provide other common services for the other software layers. The drivers 332 may be responsible for controlling or interfacing with the underlying hardware. For instance, the drivers 332 may include display drivers, camera drivers, Bluetooth™ drivers, flash memory drivers, serial communication drivers (e.g., Universal Serial Bus (USB) drivers), Wi-Fi® drivers, audio drivers, power management drivers, and so forth depending on the hardware configuration.

The libraries 316 may provide a common infrastructure that may be used by the applications 320 and/or other components and/or layers. The libraries 316 typically provide functionality that allows other software modules to perform tasks in an easier fashion than to interface directly with the underlying operating system 314 functionality (e.g., kernel 328, services 330 and/or drivers 332). The libraries 416 may include system libraries 334 (e.g., C standard library) that may provide functions such as memory allocation functions, string manipulation functions, mathematic functions, and the like. In addition, the libraries 316 may include API libraries 336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 316 may also include a wide variety of other libraries 338 to provide many other APIs to the applications 320 and other software components/modules.

The frameworks 318 (also sometimes referred to as middleware) provide a higher-level common infrastructure that may be used by the applications 320 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 320 and/or other software components/modules, some of which may be specific to a particular operating system or platform.

The applications 320 include built-in applications 340 and/or third-party applications 342. Examples of representative built-in applications 340 may include, but are not limited to, a contacts application, a browser application, a book reader application, a location application, a media application, a messaging application, and/or a game application. Third-party applications 342 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 342 may invoke the API calls 324 provided by the mobile operating system such as operating system 314 to facilitate functionality described herein.

The applications 320 may use built-in operating system functions (e.g., kernel 328, services 330 and/or drivers 332), libraries 316, or frameworks/middleware 318 to create user interfaces to interact with users of the system. Alternatively, or additionally, in some systems, interactions with a user may occur through a presentation layer, such as the presentation layer 344. In these systems, the application/module "logic" can be separated from the aspects of the application/module that interact with a user.

Some software architectures use virtual machines. In the example of FIG. 3, this is illustrated by a virtual machine 348. The virtual machine 348 creates a software environment where applications/modules can execute as if they were executing on a hardware machine (such as the machine 400 of FIG. 4, for example). The virtual machine 346 is hosted by a host operating system (e.g., operating system 314) and typically, although not always, has a virtual machine monitor 346, which manages the operation of the virtual machine 348 as well as the interface with the host operating system (i.e., operating system 314). A software architecture executes within the virtual machine 348 such as an operating system (OS) 350, libraries 352, frameworks 354, applications 356, and/or a presentation layer 358. These layers of software architecture executing within the virtual machine 348 can be the same as corresponding layers previously described or may be different.

Figure 4:
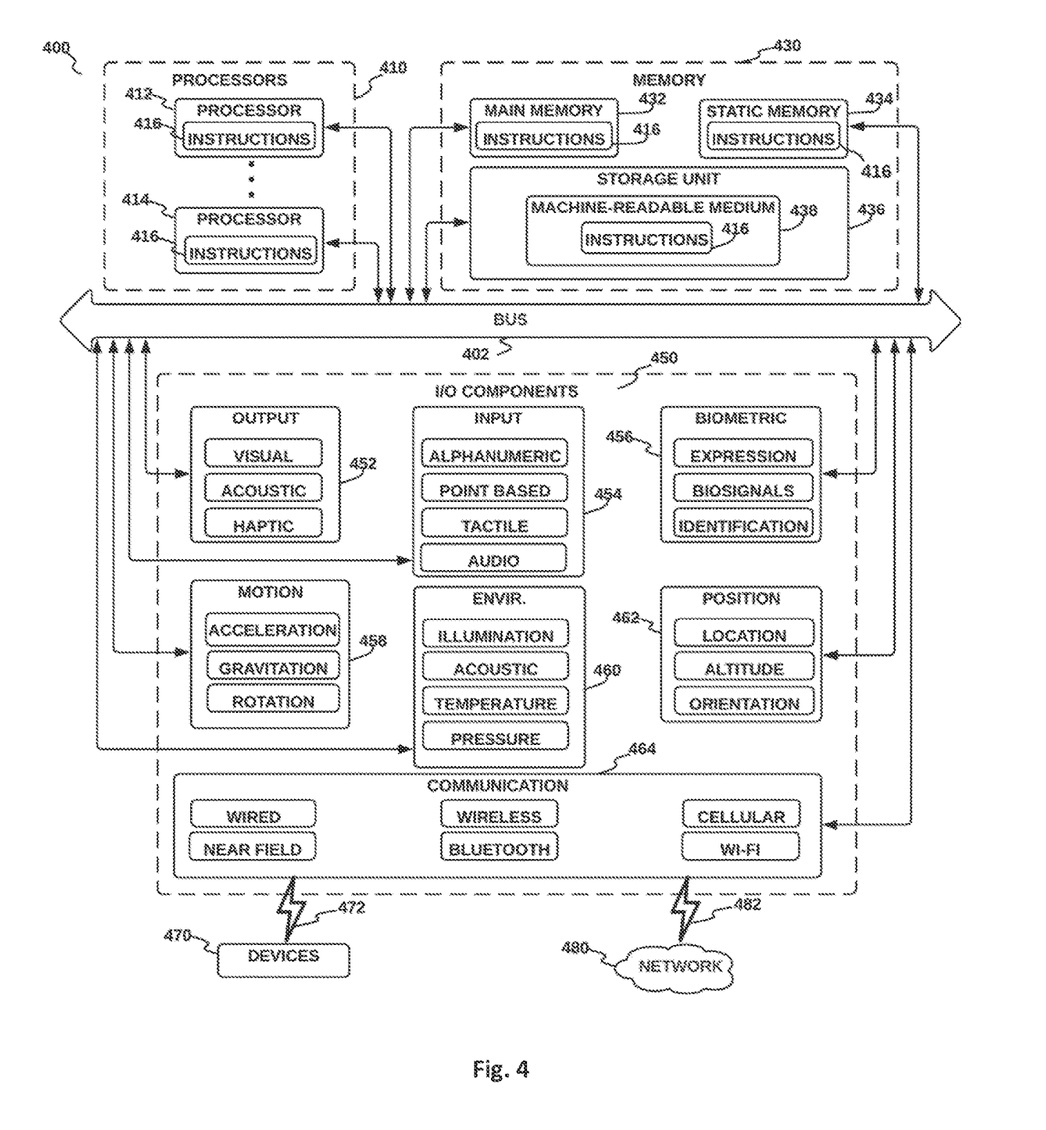
FIG. 4 is a block diagram illustrating components of a machine, according to some example embodiments, configured to read instructions from a machine-readable medium (e.g., a machine-readable storage medium) and perform any one or more of the methodologies discussed herein.

FIG. 4 is a block diagram illustrating components of a machine 400, according to some example embodiments, configured to read instructions from a machine-readable medium (e.g., a machine-readable storage medium) and perform any one or more of the methodologies discussed herein. In some embodiments, the machine 400 is similar to the incremental topological update device 104. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. As such, the instructions 416 may be used to implement modules or components described herein. The instructions transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines that individually or jointly execute the instructions 416 to perform any one or more of the methodologies discussed herein.

The machine 400 may include processors 410, memory 430, and input/output (I/O) components 450, which may be configured to communicate with each other such as via a bus 402. In an example embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 412 and a processor 414 that may execute the instructions 416. The term "processor" is intended to include multi-core processor that may comprise two or more independent processors (sometimes referred to as "cores") that may execute instructions contemporaneously. Although FIG. 4 shows multiple processors, the machine 400 may include a single processor with a single core, a single processor with multiple cores (e.g., a multi-core processor), multiple processors with a single core, multiple processors with multiples cores, or any combination thereof.

The memory/storage 430 may include a memory, such as a main memory 432, a static memory 434, or other memory, and a storage unit 436, both accessible to the processors 410 such as via the bus 402. The storage unit 436 and memory 432, 434 store the instructions 416 embodying any one or more of the methodologies or functions described herein. The instructions 416 may also reside, completely or partially, within the memory 432, 434, within the storage unit 436, within at least one of the processors 410 (e.g., within the processor's cache memory), or any suitable combination thereof, during execution thereof by the machine 400. Accordingly, the memory 432, 434, the storage unit 436, and the memory of processors 410 are examples of machine-readable media 438.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine 400 (e.g., processors 410), cause the machine 400 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 450 may include a wide variety of components to receive input, provide output, produce output, transmit information, exchange information, capture measurements, and so on. The specific input/ output (I/O) components 450 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 450 may include many other components that are not shown in FIG. 4. The input/output (I/O) components 450 are grouped according to functionality merely for simplifying the following discussion and the grouping is in no way limiting. In various example embodiments, the input/output (I/O) components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous cases for safety or to measure pollutants in the atmosphere), or other components that may provide indications, measurements, or signals corresponding to a surrounding physical environment. The position components 462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 450 may include communication components 464 operable to couple the machine 400 to a network 480 or devices 470 via a coupling 482 and a coupling 472 respectively. For example, the communication components 464 may include a network interface component or other suitable device to interface with the network 480. In further examples, the communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a Universal Serial Bus (USB)).

Moreover, the communication components 464 may detect identifiers or include components operable to detect identifiers. For example, the communication components 464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 462, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
one or more computer processors;
one or more computer memories;
a set of instructions stored in the one or more computer memories, the set of instructions configuring the one or more computer processors to perform operations, the operations comprising:
receiving first application data, the first application data including first graph data, the first graph data corresponding to a first state of an application;
receiving second application data after the first application data, the second application data corresponding to a second state of the application;
analyzing the first application data and the second application data to determine a change in the first graph data associated with the second application data;
determining an island subgraph within the first graph data that includes the change, the island subgraph relating to an aspect of a virtual environment, wherein the aspect is present within the first and the second state;
generating second graph data for the second state, wherein the generating includes partially reconstructing the first graph data, the partial reconstructing including rebuilding the determined island subgraph; and
communicating the generated second graph data for rendering of the virtual environment in the second state.

2. The system of claim 1, further comprising identifying the islands subgraph that has changed based on a determination that the change in the first graph data relates to a node change, the node change including an addition of a node or a removal of a node.

3. The system of claim 1, wherein the partial reconstructing of the first graph includes applying one or more heuristics to perform one or more of adding, removing, or rearranging one or more of nodes, connections or data to improve a speed of the rendering.

4. The system of claim 1, wherein the partial reconstructing of the first graph includes performing memory compaction by writing data associated with the island subgraph in contiguous memory location in an order that the data is needed during the rendering.

5. The system of claim 1, wherein the island subgraph includes a plurality of associated island subgraphs and partial reconstructing includes rebuilding a first island subgraph of the plurality of the island subgraphs in parallel with rebuilding a second island subgraph of the plurality of island subgraphs.

6. The system of claim 1, wherein the application data includes application input data from a control device, the control device configured to control an aspect of the application.

7. The system of claim 1, wherein the partially reconstructing the first graph data includes removing the determined island subgraph based on the determined island subgraph having a graphical output during the rendering that is below a threshold graphical output.

8. A non-transitory computer-readable storage medium storing a set of instructions that, when executed by one or more computer processors, cause the one or more computer processors to operation operations, the operations comprising:
receiving first application data, the first application data including first graph data, the first graph data corresponding to a first state of an application;
receiving second application data after the first application data, the second application data corresponding to second state of the application;
analyzing the first application data and the second application data to determine a change in the first graph data associated with the second application data;
determining an island subgraph within the first graph data that includes the change, the island subgraph relating to an aspect of a virtual environment, wherein the aspect is present within the first and the second state;
generating second graph data for the second state, wherein the generating includes partially reconstructing the first graph data, the partial reconstructing including rebuilding the determined island subgraph; and
communicating the generated second graph data for rendering of the virtual environment in the second state.

9. The non-transitory computer-readable storage medium of claim 8, further comprising identifying the islands subgraph that has changed based on a determination that the change in the first graph data relates to a node change, the node change including an addition of a node or a removal of a node.

10. The non-transitory computer-readable storage medium of claim 8, wherein the partial reconstructing of the first graph includes applying one or more heuristics to perform one or more of adding, removing, or rearranging one or more of nodes, connections or data to improve a speed of the rendering.

11. The non-transitory computer-readable storage medium of claim 8, wherein the partial reconstructing of the first graph includes performing memory compaction writing data associated with the island subgraph in contiguous memory location in an order that the data is needed during the rendering.

12. The non-transitory computer-readable storage medium of claim 8, wherein the island subgraph includes a plurality of associated island subgraphs and partial reconstructing includes rebuilding a first island subgraph of the plurality of the island subgraphs in parallel with rebuilding a second island subgraph of the plurality of island subgraphs.

13. The non-transitory computer-readable storage medium of claim 8, wherein the application data includes application input data from a control device, the control device configured to control an aspect of the application.

14. The non-transitory computer-readable storage medium of claim 8, wherein the partially reconstructing the first graph data includes removing the determined island subgraph based on the determined island subgraph having a graphical output during the rendering that is below a threshold graphical output.

15. A method comprising:
receiving first application data, the first application data including first graph data, the first graph data corresponding to a first state of an application;
receiving second application data after the first application data, the second application data corresponding to a second state of the application;

analyzing the first application data and the second application data to determine a change in the first graph data associated with the second application data;

determining an island subgraph within the first graph data that includes the change, the island subgraph relating to an aspect of a virtual environment, wherein the aspect is present within the first and the second state;

generating second graph data for the second state, wherein the generating includes partially reconstructing the first graph data, the partial reconstructing including rebuilding the determined island subgraph; and communicating the generated second graph data for rendering of the virtual environment in the second state.

16. The method of claim 15, further comprising identifying the islands subgraph that has changed based on a determination that the change in the first graph data relates to a node change, the node change including an addition of a node or a removal of a node.

17. The method of claim 15, wherein the partial reconstructing of the first graph includes applying one or more heuristics to perform one or more of adding, removing, or rearranging one or more of nodes, connections or data to improve a speed of the rendering.

18. The method of claim 15, wherein the partial reconstructing of the first graph includes performing memory compaction by writing data associated with the island subgraph in contiguous memory location in an order that the data is needed during the rendering.

19. The method of claim 15, wherein the island subgraph includes a plurality of associated island subgraphs and partial reconstructing includes rebuilding a first island subgraph of the plurality of the island subgraphs in parallel with rebuilding a second island subgraph of the plurality of island subgraphs.

20. The method of claim 15, wherein the application data includes application input data from a control device, the control device configured to control an aspect of the application.

* * * * *

UNITED STATES PATENT AND TRADEMARK OFFICE
CERTIFICATE OF CORRECTION

| | |
|---|---|
| PATENT NO. | : 11,951,390 B2 |
| APPLICATION NO. | : 17/341359 |
| DATED | : April 9, 2024 |
| INVENTOR(S) | : Thorborg et al. |

Page 1 of 1

It is certified that error appears in the above-identified patent and that said Letters Patent is hereby corrected as shown below:

In the Claims

In Column 20, Line 4, in Claim 8, after "to", delete "operation"

In Column 20, Line 12, in Claim 8, before "second", insert --a--

In Column 20, Line 40, in Claim 11, after "compaction", insert --by--

Signed and Sealed this
Seventh Day of January, 2025

Derrick Brent
*Acting Director of the United States Patent and Trademark Office*